United States Patent
Lee et al.

(10) Patent No.: US 8,207,999 B2
(45) Date of Patent: Jun. 26, 2012

(54) METHOD AND APPARATUS FOR VIDEO TELEPHONY IN MOBILE TERMINAL

(76) Inventors: Hae Sun Lee, Seoul (KR); Byung Kwon Kang, Suwon-si (KR); Young Kwon Yoon, Seoul (KR); Yong Gu Lee, Bucheon-si (KR); Myoung Won Kim, Yongin-si (KR)

( * ) Notice: Subject to any disclaimer, the term of this patent is extended or adjusted under 35 U.S.C. 154(b) by 800 days.

(21) Appl. No.: 12/326,163

(22) Filed: Dec. 2, 2008

(65) Prior Publication Data

US 2009/0147141 A1 Jun. 11, 2009

(51) Int. Cl.
*H04N 7/14* (2006.01)
(52) U.S. Cl. ...................................... 348/14.02
(58) Field of Classification Search ............... 379/14.02; 382/118, 190
See application file for complete search history.

(56) References Cited

U.S. PATENT DOCUMENTS

| | | | |
|---|---|---|---|
| 7,847,831 B2 * | 12/2010 | Kadono | 348/14.02 |
| 2007/0200916 A1 * | 8/2007 | Han | 348/14.01 |
| 2007/0201726 A1 * | 8/2007 | Steinberg et al. | 382/103 |
| 2007/0252674 A1 * | 11/2007 | Nelson et al. | 340/5.53 |

* cited by examiner

*Primary Examiner* — Stella Woo
(74) *Attorney, Agent, or Firm* — Cha & Reiter, LLC (57) ABSTRACT

A method and apparatus for video telephony in a mobile terminal includes: extracting, after establishment of a video call, a facial feature from a video image captured by a camera unit of the mobile terminal, comparing the extracted facial feature with that of a pre-stored reference image, and correcting the video image according to the facial feature of the reference image. The corrected video image is transmitted to a counterpart of the video call.

18 Claims, 5 Drawing Sheets

METHOD AND APPARATUS FOR VIDEO TELEPHONY IN MOBILE TERMINAL

CLAIM OF PRIORITY

This application claims the benefit under 35 U.S.C. §119(a) of a Korean patent application filed in the Korean Intellectual Property Office on Dec. 11, 2007 and assigned Serial No. 2007-0128150, the entire disclosure of which is hereby incorporated by reference in its entirety.

BACKGROUND OF THE INVENTION

1. Field of the Invention

The present invention relates generally to a mobile terminal. More particularly, the present invention relates to a method and apparatus for video telephony in a mobile terminal and a method for correcting distortion during a video call.

2. Description of the Related Art

Video-enabled terminals are generally used by their users to perform audio and visual communication for transmitting and receiving images and voices through video and audio channels. Video telephony enables users of camera-equipped video terminals to see each other during phone conversations. Video telephony services can be provided through circuit-switching based on exchangers or through packet-switching over All-IP networks (IP for Internet Protocol). A video telephony service on a mobile communication network can be implemented, for example, according to the H.323 or H.324M recommendation from the International Telecommunications Union (ITU). H.323 is a system protocol for providing a video telephony service on a packet data network such as an IP-based network, H.324 is a system protocol for voice, video and data transmission over a public network, and H.324M (Mobile) is a version of H.324 adapted for mobile communication.

In audio/visual communication, typically comprising a conversation using a mobile terminal during a video call, the image of the user is captured by a camera unit of the mobile terminal and transmitted to the counterpart without image filtering.

Figure 1:
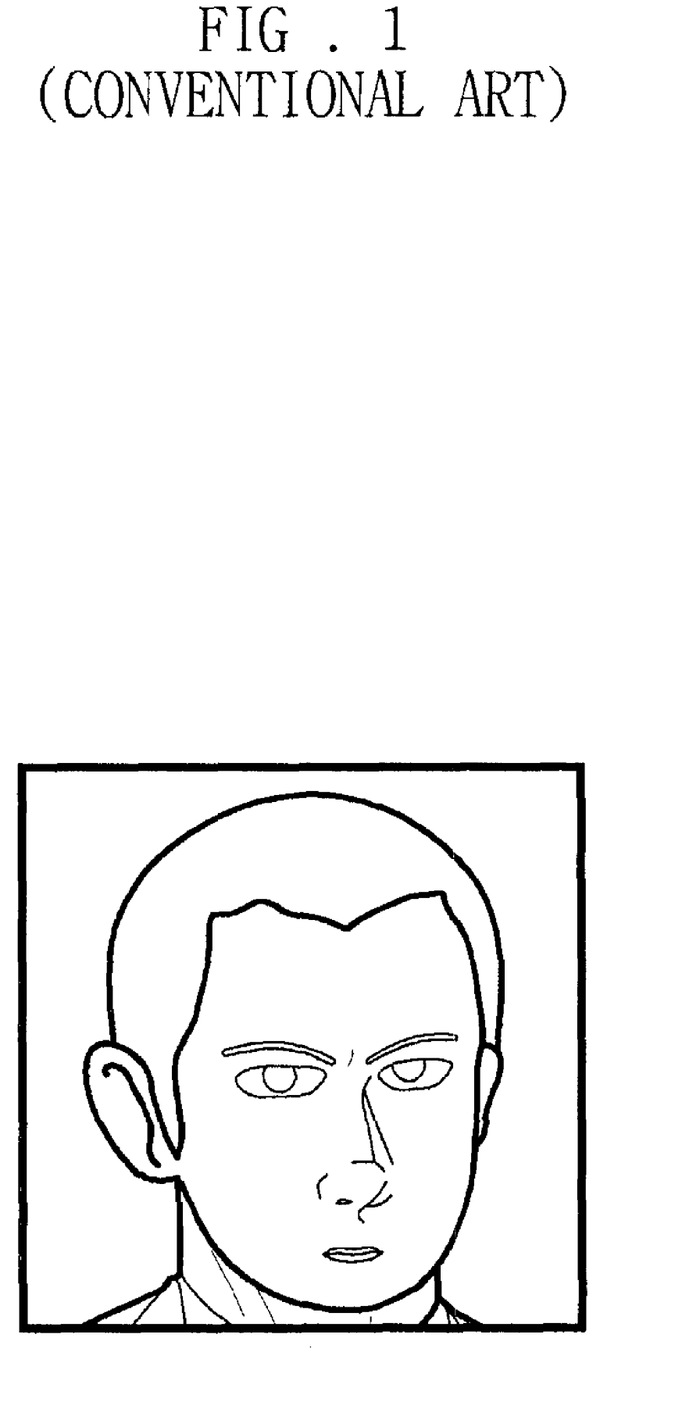
FIG. 1 illustrates a video image of a user that is captured by a conventional video-enabled mobile terminal for transmission during a video call.

FIG. 1 illustrates a video image of a user that is captured by a video-enabled mobile terminal for transmission during a conventional video call.

The image of FIG. 1 is one obtained in a usual manner through a self-shot function of the mobile terminal. As shown, the face image is enlarged and somewhat distorted. The reason for the enlarged and distorted image is that in order to obtain a natural looking face image during a video call, the user is inconvenienced by having to stretch an arm holding the mobile terminal to take a picture of his own face. Typically cameras are designed to be a minimum of about three feet or more from a subject, making the self-shot very difficult to obtain with good quality.

SUMMARY OF THE INVENTION

The present invention provides a method and apparatus for video telephony in a mobile terminal wherein natural looking face images can be obtained during an audio-video call regardless of a shooting distance of the participant/user.

In accordance with an exemplary embodiment of the present invention, there is provided a method of video telephony in a mobile terminal, including the steps of: extracting, after establishment of a video call, a facial feature from a video image captured by a camera unit of the mobile terminal, comparing the extracted facial feature with that of a pre-stored reference image, and correcting the video image according to the facial feature of the reference image; and transmitting the corrected video image to a counterpart of the video call.

The extracted facial feature used for comparison may include at least one of a point representing a position of the face, a line connecting two or more points together, an angle between two lines, and a surface formed by three or more interconnected lines.

According to the present invention, the facial feature can be defined, for example, by a triangle having vertices of two eye centers and the mid-point of lips in a face image, and the video image may be corrected so as to match the reference image in terms of at least one of the lengths of three sides of the triangle, ratios between the lengths of three sides, and an angle made by two sides with a common vertex.

Alternatively, according to the present invention, the facial feature can be defined, for example, by a distance between two eyes in a face image, and the video image may be corrected so as to match the reference image in terms of the distance between two eyes.

Alternatively, the facial feature can be defined by an area of the face corresponding to the area of a polygon composed of points along an outline of the face in a face image, and the video image may be corrected so as to match the reference image in terms of the face area.

In accordance with still another exemplary embodiment of the present invention, there is provided an apparatus for video telephony in a mobile terminal, including: a radio communication unit transmitting and receiving video images; a camera unit capturing a video image; and a control unit extracting, after establishment of a video call, a facial feature from a video image captured by the camera unit, comparing the extracted facial feature with that of a pre-stored reference image, and correcting the video image according to the facial feature of the reference image. The apparatus may further include, for example, a storage unit storing the facial features extracted from the reference image and video image.

According to the present invention, the control unit may send the corrected video image, for example, through the radio communication unit.

The facial feature may include, for example, at least one of a point representing a position of the face, a line connecting two or more points together, an angle between two lines, and a surface formed by three or more interconnected lines. The facial feature is defined by a triangle having vertices of two eye centers and the mid-point of lips in a face image, and the control unit may correct the video image so that the video image matches the reference image in terms of at least one of the lengths of three sides of the triangle, ratios between the lengths of three sides, and an angle made by two sides with a common vertex.

Alternatively, the facial feature can be defined, for example, by a distance between two eyes in a face image, and the control unit may correct the video image so that the video image matches the reference image in terms of the distance between two eyes.

Alternatively, the facial feature can also be defined, for example, by a face area corresponding to the area of a polygon composed of points along an outline of the face in a face image, and the control unit may corrects the video image so that the video image matches the reference image in terms of the face area.

According to one exemplary aspect of the present invention, during a video call using a video-enabled mobile terminal, video images are corrected with respect to a pre-stored reference image before transmission. Hence, natural looking images can be sent to the counterpart even when the user is photographed in any direction or position using a self-shot function of the mobile terminal. This corrected and natural looking image will contribute the growing popularity of mobile terminals capable of video telephony.

BRIEF DESCRIPTION OF THE DRAWINGS

The features and advantages of the present invention will be more apparent from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

For the purpose of description, a mobile communication terminal capable of video telephony according to the present invention is described in the following examples as a mobile terminal, however the present invention is not limited thereto. While the mobile terminal of the present invention is a terminal capable of video telephony, the invention can be arranged in any type of communication appliance or multimedia appliance, such as mobile communication terminals, mobile phones, personal digital assistants, smart phones, international mobile telecommunications 2000 (IMT 2000) terminals, universal mobile telecommunications system (UMTS) terminals, notebooks, laptops, or personal computers, just to name a few of the many possible arrangements.

Hereinafter, the configuration of a mobile terminal is described.

Figure 2:
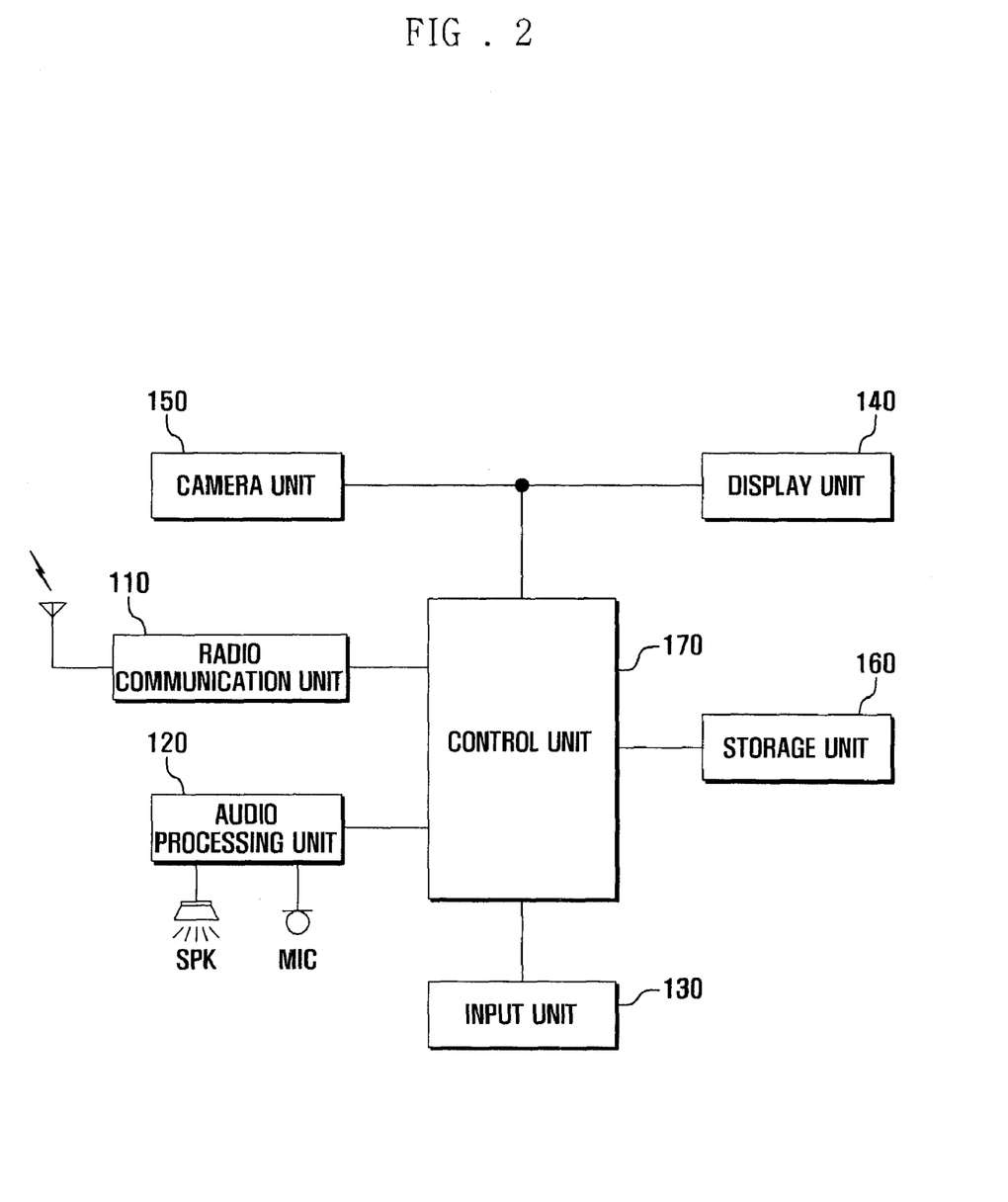
FIG. 2 is a block diagram illustrating a mobile terminal according to an exemplary embodiment of the present invention.

FIG. 2 is a block diagram illustrating a mobile terminal according to an exemplary embodiment of the present invention.

Referring now to FIG. 2, the video-enabled mobile terminal includes a radio communication unit 110, audio processing unit 120, input unit 130, display unit 140, camera unit 150, storage unit 160, and control unit 170. An artisan understands and appreciates that these units are shown according to functionality, and it is possible that one or more of them may be combined in a common structure.

Still referring to FIG. 2, the radio communication unit 110 performs operations related to radio transmission and reception for a video call. The radio communication unit 110 can include a radio frequency (RF) transmitter for upconverting the frequency of a signal carrying a video call bit stream and amplifying the signal for transmission, and an RF receiver for low-noise amplifying a received signal carrying a video call bit stream and downconverting the frequency of the received signal.

The audio processing unit 120 reproduces an audio stream from the control unit 170 through a speaker SPK, and also converts an analog signal such as a voice or acoustic signal from a microphone MIC into a digital signal and sends the digital signal to the control unit 170.

The input unit 130 includes a plurality of alphanumeric and function keys for inputting alphanumeric information and for setting various functions. The input unit 130 transmits key signals from the user for setting and controlling the mobile terminal to the control unit 170.

The display unit 140 displays images from the camera unit 150 on the screen, and displays a video stream from the control unit 170. The display unit 140 displays menus and function settings of the mobile terminal, information input by the user, and information to be provided to the user. The display unit 140 may include a panel of liquid crystal display (LCD) devices. If the panel has a touch screen capability, the display unit 140 can perform, in part or whole, the function of the input unit 130.

In addition, the camera unit 150 provides a photographing function of the mobile terminal. The camera unit 150 includes a camera module (not shown), signal processor (not shown), and image processor (not shown). The camera module typically includes a lens for forming an image of a target object, and a camera sensor for converting an optical signal corresponding to the formed image into an electrical signal. The camera sensor may preferably comprise a charge-coupled device (CCD) sensor. The signal processor converts the analog video signal from the camera sensor into a digital video signal. The signal processor preferably comprises a digital signal processor (DSP). The image processor generates screen data to display a video signal from the signal processor, and outputs video data compliant to the specification of the display unit 140 under the control of the control unit 170.

With continued reference to FIG. 2, the storage unit 160 stores application programs and associated data necessary for the operation of the mobile terminal. The storage unit 160 can include one or more buffers to temporarily store data generated from execution of application programs. The storage unit 160 may include a program storage section and a data storage section. The program storage section stores an operating system (OS) for booting the mobile terminal, and application programs for supplementary functions. The data storage section stores data generated from the utilization of the mobile terminal. In particular, the data storage section can store a reference image and data extracted from the reference image.

The control unit 170 functions to control the overall operation of the mobile terminal and signal exchange between internal elements thereof. That is, the control unit 170 typically controls signal exchange between the audio processing unit 120, input unit 130, display unit 140, camera unit 150, and storage unit 160.

In addition, the control unit 170 can include a codec, modem, and multiplexer/demultiplexer. The codec encodes a signal to be sent such as a video or audio signal, and decodes a received coded signal. The multiplexer/demultiplexer multiplexes coded signals for transmission, and demultiplexes a multiplexed signal. The modem modulates a multiplexed signal for transmission, and demodulates a modulated signal received by the radio communication unit 110. The codec, modem, and multiplexer/demultiplexer may be included in the radio communication unit 110, or may be implemented as a separate entity between the radio communication unit 110 and control unit 170. In particular, the control unit 170 provides end-to-end signaling for appropriate operation of the mobile terminal. For example, the control unit 170 sends a video call setup message through a control channel, and provides messages to open and represent logical channels.

Although not shown, a person of ordinary skill in art will appreciate that the apparatus of the present invention may further include any type of a storage media connector for connection with an external storage medium such as a memory card for storing data, a connection terminal for exchanging data with an external digital appliance, and charge terminal. The apparatus of the present invention may further include supplementary units, such as a broadcast receiving module to receive digital broadcasts and, for example, an MP3 module or other type of module to play back digital audio materials.

With the digital convergence trend, it should be apparent to those skilled in the art that the apparatus of the present invention may further include a unit comparable to the above-described units.

Hereinafter, a method of video telephony using the mobile terminal with the above-described configuration is described. In the present invention, a pre-stored image is used during a video call for comparison to correct a current image before transmission to the counterpart. In other words, an image captured during a video call is corrected with respect to the pre-stored image, and then sent to the counterpart. In the description, an image to be sent to a counterpart is referred to as a "video image", and a pre-stored image taken in advance is referred to as a "reference image".

According to a preferred exemplary method, a reference image of the user should be stored. Multiple still images of the user may be stored, which were captured by several photographs, and then one or more of the stored still images is selected as a reference image for comparison and correction purposes.

Table 1 illustrates a setting menu to set a reference image.

TABLE 1

|  | depth #1 | depth #2 | depth #3 | depth #4 |
|---|---|---|---|---|
| menu #1 | usage environment | video call | video call screen | alternative image |
| menu #2 | . . . | . . . | . . . | picture quality |
| menu #3 | . . . | . . . | . . . | screen size |
| menu #4 | . . . | . . . | . . . | reference image |

As shown in Table 1, the user can traverse setting menus "usage environment", "video call", and "video call screen" to "reference image", and can register a reference image using the setting menu "reference image". The reference image can be an image of the user captured through self-shooting with the mobile terminal. The user can select one or more of pre-stored photographs or take a new photograph of the user and save the photograph, and register the selected or newly saved photograph as a reference image.

The reference image is used as a criterion to correct a video image of the user during a video call, as the self-shot image when one is taking part in a video call is often distorted. The mobile terminal extracts facial features from the reference image and saves the extracted facial features as face representation elements. Face representation elements can include points, lines, angles and surfaces. That is, at least one of a point representing a position of the face, a line connecting two or more points together, an angle between two lines, and a surface formed by three or more interconnected lines can be used to represent the face of the reference image.

For example, face representation elements can comprise point elements that include particular points in the eyes, nose, mouth, and ears. Length elements can include the length between the ears, philtrum length, nose length, lip length, eye length, and length between the eyes. Angle elements can include an angle between two intersecting lines, and area elements can include the face area and forehead area.

Figure 3:
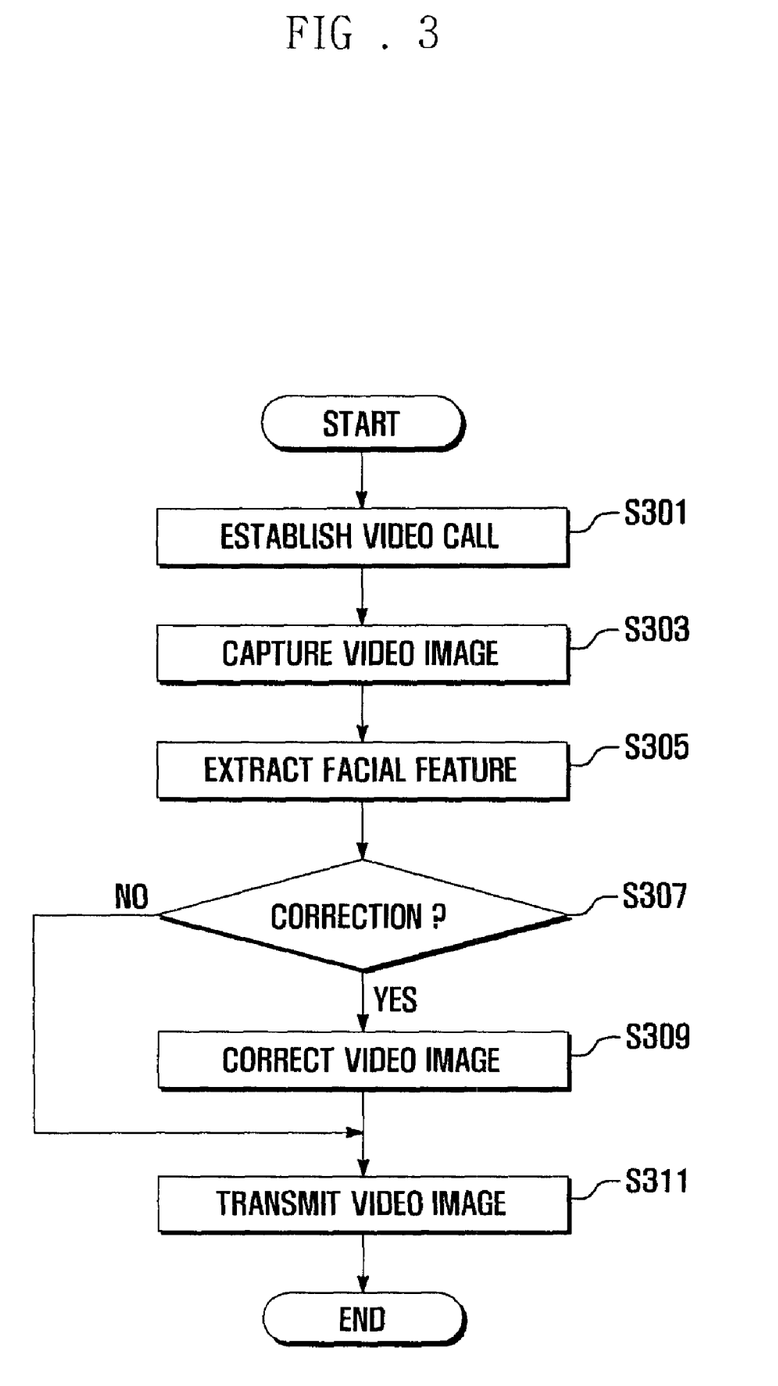
FIG. 3 is a flow chart illustrating a method of video telephony in a mobile terminal according to another exemplary embodiment of the present invention.

During a video call after registration of a reference image, a video image is compared with the reference image and corrected. Next, a method of video telephony is described. FIG. 3 is a flow chart illustrating a method of video telephony in the mobile terminal according to another exemplary embodiment of the present invention. The mobile terminal is assumed to store a reference image in advance.

Referring to FIG. 3, the control unit 170 establishes a video call (S301). The video call can be an incoming call or outgoing video call.

A brief introduction to video call establishment is provided. In the following description, the term "base station" refers to a communication system that includes base stations serving radio access networks, radio network controllers (RNC), mobile switching centers (MSC), gateway mobile switching centers (GMSC), and a home location register (HLR). In addition to this circuit switched network, the base station may include a core network including a packet switched network. A mobile terminal can connect to an MSC through a radio access network and base station.

For call establishment, messages such as an initial address message (IAM), address complete message (ACM) and answer message (ANM) are exchanged between a calling party MSC and called party MSC. Descriptions of these messages are omitted here, but may be found at the section "General Mobile to Mobile 3G-324M call setup procedure" in "3G TR 23.972 V3.00".

To establish a video call at step 301, a calling mobile terminal sends a call setup message through a base station to a called mobile terminal. The call setup message contains call-related information such as calling party number, called party number and necessary transmission capacity. When information sufficient for call establishment is provided, the base station sends a call proceeding message to the calling mobile terminal. This call proceeding message is a progress indicator of the current call, and does not affect the call state. In response to the call setup message, the called mobile terminal sends a call confirm message through the base station to the calling mobile terminal. The call confirm message contains call-related information such as called party number and necessary transmission capacity. Hence, the base station obtains information necessary for transmitting video and voice signals, such as calling party number, called party number and transmission capacity, on the basis of the call setup message from the calling mobile terminal and the call confirm message from the called mobile terminal. After sending the call confirm message, the called mobile terminal sends an alerting message through the base station to the calling mobile terminal. The alerting message triggers generation of a ring back tone and ring tone in the calling mobile terminal and called mobile terminal, respectively. When the user of the called mobile terminal accepts the call connection request during generation of a ring tone, the called mobile terminal sends a connect message. Upon reception of the connect message, the calling mobile terminal sends a connect acknowledge message. When the called mobile terminal receives the connect acknowledge message, a communication path for a video call is established between the two ends (calling mobile terminal and called mobile terminal).

After video call establishment, the control unit 170 then receives a video image from the camera unit 150 (S303). The video image is an image captured by the camera unit 150.

The control unit 170 extracts facial features from the video image (S305). The control unit 170 determines necessity of correction of the video image (S307). To determine the necessity of correction, the facial features extracted from the video image are compared to those extracted from the pre-stored reference image. If the error therebetween is greater than or equal to a preset value, the control unit 170 determines that correction of the video image is necessary.

If correction of the video image is necessary, the control unit 170 corrects the video image (S309). The video image is corrected according to the facial features extracted from the reference image. Thereafter, the control unit 170 controls the radio communication unit 110 to send the corrected video image to the counterpart mobile terminal connected through a video call (S311).

If correction of the video image is unnecessary, the control unit 170 controls the radio communication unit 110 to send the uncorrected video image (S311).

Hereinabove, the method of video telephony has been described. Next, correction of a video image at step S309 (in FIG. 3) is described in more detail. For video image correction, the facial features of the video image are compared to those of the reference image, and the video image is corrected in correspondence with the facial features of the reference image.

As described before, facial features can be represented by points, lines, angles and surfaces. Next, facial features extracted from the reference image and corresponding correction are described.

Figure 4A:
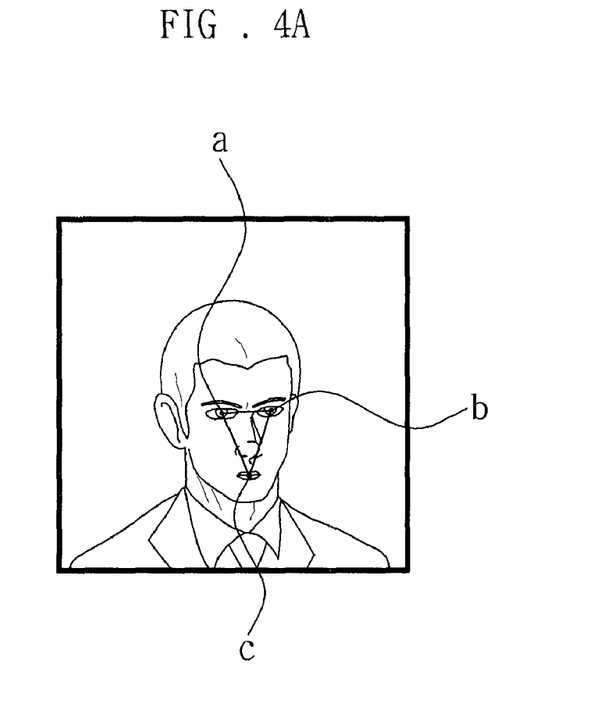
FIG. 4A illustrates a reference image with facial features.

FIG. 4A illustrates a reference image with facial features.

As shown in FIG. 4A, the reference image includes a triangle with vertices a, b and c, wherein a and b are the eye centers, and c is the mid-point of the lips. The mobile terminal can save, as facial features, the lengths of three sides of the triangle, ratios between the lengths of three sides, and an angle made by two sides with a common vertex.

In this particular case shown in FIG. 4A, the control unit 170 extracts facial features (the lengths of three sides of the triangle with vertices a, b and c described in FIG. 4A, ratios between the lengths of three sides, and an angle made by two sides with a common vertex) from the video image at step S305, and compares the extracted facial features with those of the stored reference image at step S307.

If the comparison results indicate a discrepancy, the control unit 170 corrects the video image at step S309 according to the facial features extracted from the pre-stored reference image. That is, the control unit 170 can correct the video image using at least one of the lengths of three sides, ratios between the lengths of three sides, and an angle made by two sides with a common vertex.

Figure 4B:
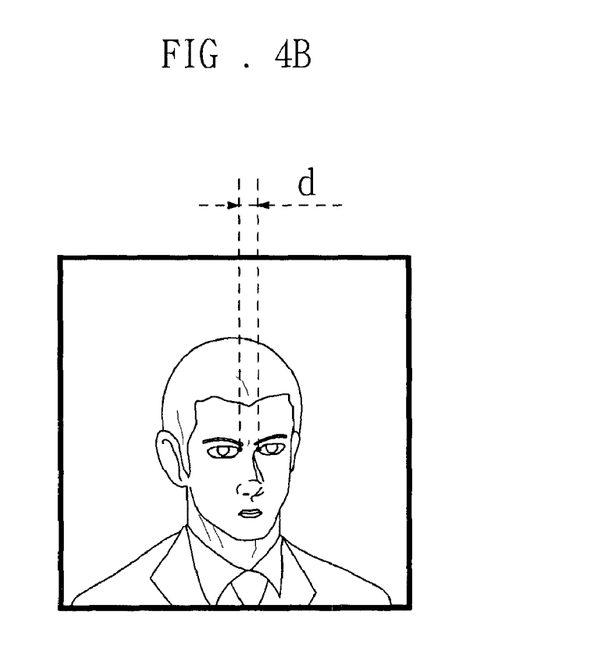
FIG. 4B illustrates another reference image with facial features.

FIG. 4B illustrates another reference image with a facial feature. As shown in FIG. 4B, the distance d between the two eyes in the reference image can be saved as a facial feature.

In this particular case shown in FIG. 4B, the control unit 170 extracts a facial feature (the distance d between the two eyes) from the video image at step S305, and compares the extracted facial feature with that of the reference image at step S307. If the comparison result indicates a discrepancy, the control unit 170 corrects the video image at step S309 according to the distance d between the two eyes in the pre-stored reference image.

Figure 4C:
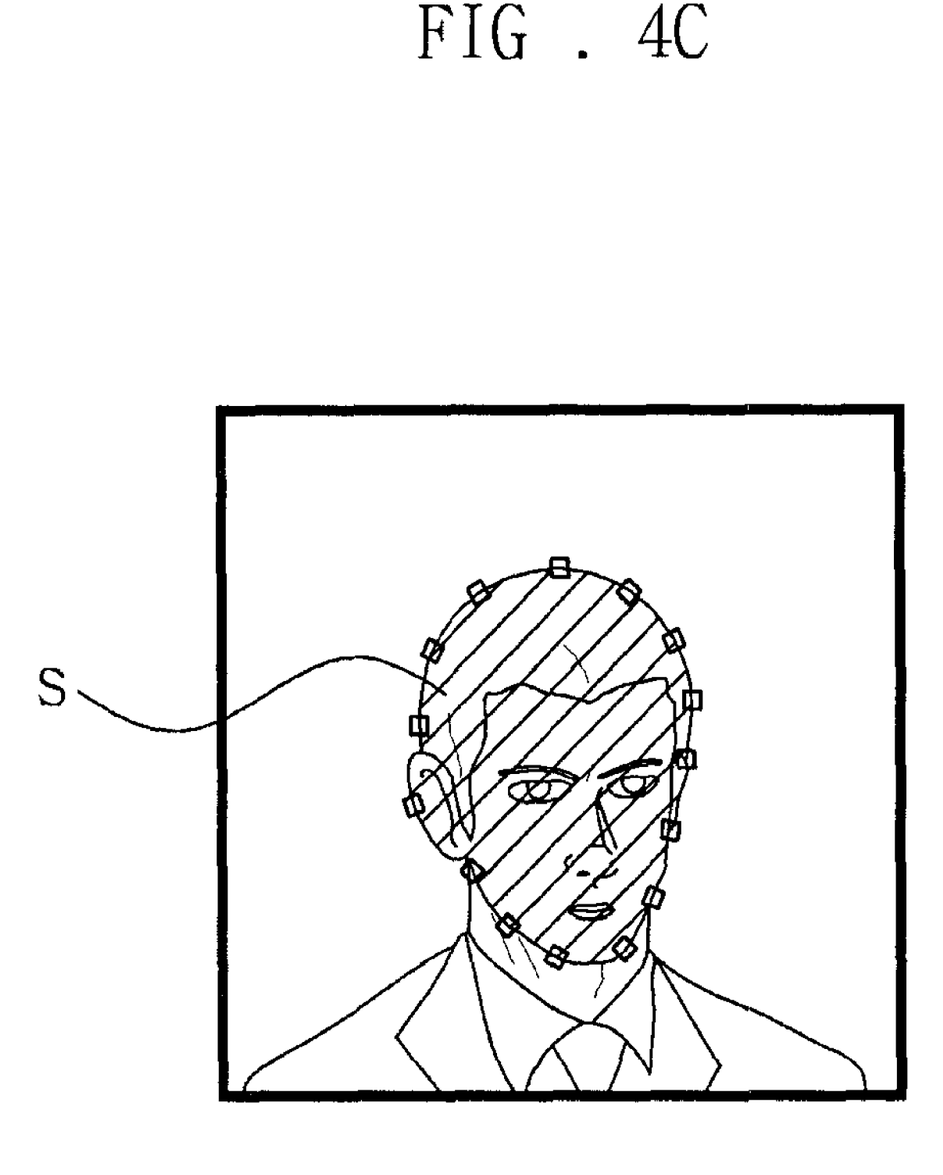
FIG. 4C illustrates yet another reference image with facial features.

FIG. 4C illustrates another reference image with a facial feature. As shown in FIG. 4C, the area S of a polygon, which is defined by a preset number of points along the outline of the face in the reference image, can be saved as a facial feature related to the face area.

In this particular case shown in FIG. 4C, the control unit 170 extracts a facial feature (the polygon area corresponding to the face outline) from the video image at step S305, and compares the extracted facial feature with that of the reference image at step S307. If the comparison result indicates a discrepancy, the control unit 170 corrects the video image at step S309 according to the polygon area corresponding to the face outline in the pre-stored reference image. The size of a displayed face image can be reduced according to the reference image using a zoom-out function.

Various image correction schemes have been described in connection with FIGS. 4A to 4C. A person of ordinary skill in the art will appreciate that these correction schemes can be used separately or used together. Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims. For example, a rectangle or other polygon may be used instead of a triangle. Also, while the reference image is typically that of the user, the mobile terminal may for example, also store images of males and females of various ages and ethnicities, at least one of which for use as a pre-selected reference image. For example, wherein the pre-stored reference image may be automatically selected from among a plurality of images having a closet facial feature to the video image captured by the mobile terminal. The pre-stored images may already have the facial feature information pre-computed for comparison with the extracted facial feature, and the method can automatically select a pre-stored reference image closest to that of the current image captured by the mobile terminal. In this way, for example, if the camera unit is arranged in a personal computer being used by an entire family, the method can select a pre-stored image of one of the family members (from data storage of all the family members) based on a closest comparison with the current image, and use that pre-stored image for correction.

Alternatively, if there is a large difference in the current image when compared with the reference image, instead of correcting the current image, the reference image could be sent. For example, if the user's hair is standing up rather than combed down, it may be preferable to send the reference image rather than correct the current image. A predetermined threshold in the amount of correction required could be the basis as to whether it is preferable to correct the current image, or to send the reference image.

Furthermore, it should be noted that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

What is claimed is:

1. A method of video telephony in a mobile terminal, comprising:
    (a) extracting, after establishment of a video call, a facial feature of a face from a video image captured by a camera unit of the mobile terminal,
    (b) comparing the extracted facial feature with that of a pre-stored reference image, and correcting the video image for distortion caused by a shooting distance of the camera according to the facial feature of the reference image; and
    (c) transmitting the corrected video image to a counterpart of the video call.

2. The method of claim 1, wherein the pre-stored reference image has been selected from among a plurality of pre-stored images having a closest facial feature to the video image captured by the camera unit.

3. The method of claim 2, wherein the plurality of pre-stored images correspond to more than one user of video telephony services.

4. The method of claim 1, wherein the facial feature includes at least one of a point representing a position of the face, a line connecting two or more points together, an angle between two lines, and a surface formed by three or more interconnected lines.

5. The method of claim 1, wherein the facial feature is defined by a triangle having vertices of two eye centers and a mid-point of lips in a face image, and wherein the video image is corrected so as to match the reference image in terms of at least one of the lengths of three sides of the triangle, ratios between the lengths of three sides, and an angle made by two sides with a common vertex.

6. The method of claim 1, wherein the facial feature is defined by a distance between two eyes in a face image, and wherein the video image is corrected so as to match the reference image in terms of the distance between two eyes.

7. The method of claim 1, wherein the facial feature is defined by a face area corresponding to an area of a polygon composed of points along an outline of the face in a face image, and wherein the video image is corrected so as to match the reference image in terms of the face area.

8. The method of claim 1, wherein the reference image is an image captured at a camera depth sufficient to obtain the reference image as a substantially distortion free image.

9. An apparatus for video telephony in a mobile terminal, comprising:
    a radio communication unit for transmitting and receiving video images;
    a camera unit for capturing a video image; and
    a control unit for extracting, after establishment of a video call, a facial feature of a face from a video image captured by the camera unit, for comparing the extracted facial feature with that of a pre-stored reference image, and for correcting the video image for distortion caused by a shooting distance of the camera according to the facial feature of the reference image.

10. The apparatus of claim 9, wherein the control unit sends the corrected video image through the radio communication unit.

11. The apparatus of claim 9, further comprising a storage unit for storing the facial features extracted from the reference image and video image.

12. The apparatus of claim 9, wherein the facial feature includes at least one of: a point representing a position of the face, a line connecting two or more points together, an angle between two lines, and a surface formed by three or more interconnected lines.

13. The apparatus of claim 9, wherein the facial feature is defined by a triangle having vertices of two eye centers and the mid-point of lips in a face image, and wherein the control unit corrects the video image of the face so that the video image matches the reference image in terms of at least one of the lengths of three sides of the triangle, ratios between the lengths of three sides, and an angle made by two sides with a common vertex.

14. The apparatus of claim 9, wherein the facial feature is defined by a distance between two eyes in a face image, and wherein the control unit corrects the video image so that the video image matches the reference image in terms of the distance between two eyes.

15. The apparatus of claim 9, wherein the facial feature is defined by a face area corresponding to an area of a polygon composed of points along an outline of the face in a face image, and wherein the control unit corrects the video image so that the video image matches the reference image in terms of the face area.

16. The apparatus of claim 9, wherein the control unit further includes selecting the pre-stored reference from among a plurality of pre-stored images having a closest facial feature to the video image captured by the camera unit.

17. The apparatus of claim 16, wherein the plurality of pre-stored images correspond to more than one user of video telephony services.

18. The apparatus of claim 9, wherein the reference image is an image captured by the camera unit at a camera depth sufficient to obtain the reference image as a substantially distortion free image.

* * * * *

UNITED STATES PATENT AND TRADEMARK OFFICE
CERTIFICATE OF CORRECTION

PATENT NO.         : 8,207,999 B2                                         Page 1 of 1
APPLICATION NO.    : 12/326163
DATED              : June 26, 2012
INVENTOR(S)        : Hae Sun Lee et al.

It is certified that error appears in the above-identified patent and that said Letters Patent is hereby corrected as shown below:

Title Page
Item [73], Assignee, should read as follows:
--Samsung Electronics Co., Ltd.
129, Samsung-ro, Yeongtong-gu, Suwon-si, Gyeonggi-do, 443-742, Republic of Korea--

Title Page
Item [30], Foreign Application Priority Data, should read as follows:
--December 30, 2007 (KR) 10-2007-0128150--

Signed and Sealed this
Twenty-ninth Day of January, 2013

David J. Kappos
*Director of the United States Patent and Trademark Office*